(12) United States Patent
Wang (10) Patent No.: US 12,483,645 B2
(45) Date of Patent: Nov. 25, 2025

(54) DISPLAY DEVICE

(71) Applicant: Wuhan China Star Optoelectronics Semiconductor Display Technology Co., Ltd., Wuhan (CN)

(72) Inventor: Wenqiang Wang, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/610,704

(22) PCT Filed: Oct. 11, 2021

(86) PCT No.: PCT/CN2021/122974
§ 371 (c)(1),
(2) Date: Apr. 6, 2023

(87) PCT Pub. No.: WO2023/050459
PCT Pub. Date: Apr. 6, 2023

(65) Prior Publication Data
US 2024/0040023 A1    Feb. 1, 2024

(30) Foreign Application Priority Data
Sep. 28, 2021   (CN) .......................... 202111144952.7

(51) Int. Cl.
*H04M 1/02* (2006.01)
(52) U.S. Cl.
CPC ....... *H04M 1/0264* (2013.01); *H04M 1/0235* (2013.01); *H04M 1/0268* (2013.01)

(58) Field of Classification Search
CPC ............ H04M 1/0235; H04M 1/0237; H04M 1/0264; H04M 1/0268
USPC ...................................................... 361/679.01
See application file for complete search history.

(56) References Cited

U.S. PATENT DOCUMENTS

| | | | |
|---|---|---|---|
| 6,963,756 B2 * | 11/2005 | Lubowicki .......... | H04M 1/0266 455/575.4 |
| 7,574,243 B2 * | 8/2009 | Lee ..................... | H04M 1/0237 455/575.4 |
| 7,787,919 B2 * | 8/2010 | Hsieh ................... | G06F 1/1656 361/679.55 |

(Continued)

FOREIGN PATENT DOCUMENTS

| | | |
|---|---|---|
| CN | 108769305 A | 11/2018 |
| CN | 110035153 A | 7/2019 |

(Continued)

*Primary Examiner* — Dameon E Levi
(74) *Attorney, Agent, or Firm* — Nathan & Associates Patent Agents Ltd.; Menachem Nathan (57) ABSTRACT

A display device includes a middle frame, a roller, a flexible display, a sliding mechanism, and a front camera. The middle frame has an upper end and a lower end. The roller is rotatably mounted on the middle frame and arranged close to the lower end. The front camera is installed on the middle frame and arranged close to the upper end. The flexible display is fixedly disposed on the sliding mechanism. The sliding mechanism is slidably mounted to the middle frame and is reciprocally movable in a first direction relative to the middle frame to drive the flexible display to expose or cover the front camera.

20 Claims, 10 Drawing Sheets

(56) References Cited

U.S. PATENT DOCUMENTS

| | | | | |
|---|---|---|---|---|
| 7,792,557 B2* | 9/2010 | Mizuta | ................ | H04M 1/0202 |
| | | | | 455/575.8 |
| 8,116,085 B2* | 2/2012 | Yeh | ....................... | G06F 1/1656 |
| | | | | 361/752 |
| 2009/0027836 A1* | 1/2009 | Wakihara | ............ | H04M 1/0237 |
| | | | | 361/679.01 |
| 2009/0209306 A1* | 8/2009 | Griffin | .................. | H04M 1/667 |
| | | | | 455/575.4 |
| 2019/0305237 A1* | 10/2019 | Shin | ........................ | G06F 3/041 |
| 2021/0103314 A1* | 4/2021 | Ko | ........................ | G06F 1/1681 |

FOREIGN PATENT DOCUMENTS

| | | | | | |
|---|---|---|---|---|---|
| CN | 110300195 A | | 10/2019 | | |
| CN | 210093271 U | | 2/2020 | | |
| CN | 111524459 A | | 8/2020 | | |
| CN | 112489564 A | * | 3/2021 | ............. | G09F 9/301 |
| EP | 4161227 A1 | * | 4/2023 | ........... | G06F 1/1624 |

* cited by examiner

DISPLAY DEVICE

BACKGROUND OF INVENTION

1. Field of Invention

The present invention relates to a technical field of displays, and particularly to a display device.

2. Related Art

Full-screen displaying is a pursuit of ultra-high screen aspect ratio design in mobile phone industries. Unfortunately, it is difficult to truly achieve a full screen due to technical limitations. Therefore, it is imperative to provide a display device featuring full screen displaying.

SUMMARY OF INVENTION

An object of the present application is to provide a display device capable of achieving a full screen.

The present application provides a technical solution as follows:

A display device, comprising a middle frame having an upper end and a lower end, a roller rotatably mounted on the middle frame and arranged close to the lower end, a front camera installed on the middle frame and arranged close to the upper end, a sliding mechanism slidably mounted to the middle frame; and a flexible display fixedly disposed on the sliding mechanism. The sliding mechanism is reciprocally movable in a first direction relative to the middle frame to drive the flexible display to expose or cover the front camera. When the flexible display exposes the front camera, part of the flexible display close to the lower end is curled on the roller. When the display device is in a full-screen display mode, the part of the flexible display close to the lower end is away from the roller.

The present application has advantageous effects as follows: in the display device of the present application, the flexible display is separately prepared from the middle frame and is fixedly installed on the sliding mechanism. Based on a sliding connection between the sliding mechanism and the middle frame, when the sliding mechanism slides up and down relative to the middle frame, the flexible display is driven to expose or cover the front camera, thereby achieving a switch between a full-screen display mode and a front camera mode of the display device as desired. In addition, the sliding connection between the sliding mechanism and the middle frame effectively improves the smoothness and stability of the display device when switching between the full-screen display mode and the front camera mode. Furthermore, the present application uses the design of the flexible display to cooperate with the roller, so that an area of the flexible display can be exactly the same as a display area, and can also be substantially the same as a plane area of the display device, thereby truly achieving a full-screen design.

BRIEF DESCRIPTION OF DRAWINGS

In order to more clearly illustrate the technical solutions in the embodiments of the present application, the following will briefly introduce the accompanying drawings that need to be used in the description of the embodiments. Apparently, the accompanying drawings in the following description show merely some embodiments of the present invention, and a person skilled in the art may still derive other drawings from these accompanying drawings without creative efforts.

DESCRIPTION OF PREFERRED EMBODIMENTS

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments in this application, all other embodiments obtained by those skilled in the art without creative work shall fall within the protection scope of this application. It should be understood that the specific embodiments described here are only used to illustrate the present application, and are not used to limit the present application. In this application, if no explanation is made to the contrary, the orientation words used, such as "upper" and "lower" usually refer to the upper and lower positions of the device in actual use or working state. Specifically, they refer to the direction of the drawings, and "inner" and "outer" refer to the outline of the device.

The present application provides a novel display device, capable of achieving full-screen displaying. The display device includes at least a middle frame, a roller, a flexible display, a sliding mechanism, and a front camera. The middle frame has an upper end and a lower end, the roller is rotatably mounted on the middle frame and arranged close to the lower end, the front camera is installed on the middle frame and arranged close to the upper end, the sliding mechanism is slidably mounted to the middle frame, and the flexible display is fixedly disposed on the sliding mechanism. Specifically, the sliding mechanism is reciprocally movable in a first direction relative to the middle frame to drive the flexible display to expose or cover the front camera. When the flexible display exposes the front camera, part of the flexible display close to the lower end is curled on the roller. When the display device is in a full-screen display mode, the part of the flexible display close to the lower end is away from the roller.

In the display device of the present application, by providing the flexible display to be fixedly connected to the sliding mechanism, the sliding mechanism, in operation, is reciprocally movable in the first direction relative to the middle frame to drive the flexible display to expose or cover the front camera, thereby achieving a switch between a full-screen display mode and a front camera mode as desired.

The specific embodiments of the display device provided in the present application will be described below.

Figure 1:
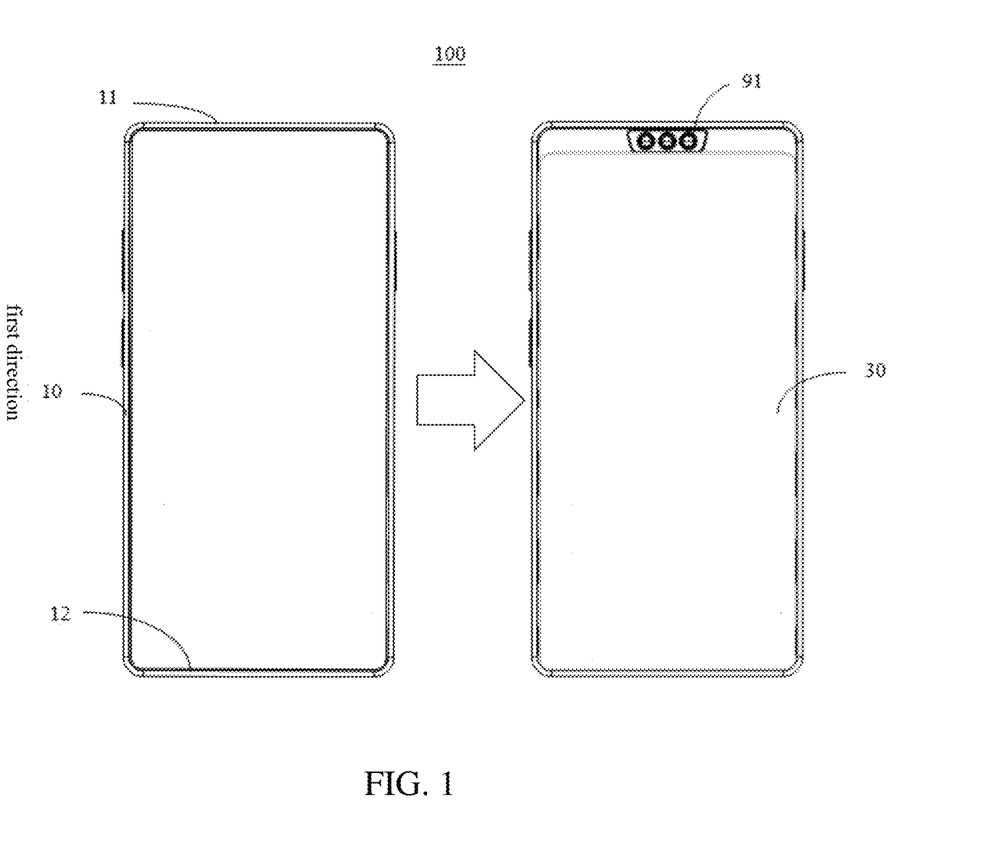
FIG. 1 is a schematic plan view of a display device of the present application in a full-screen display mode and a front camera mode.

FIG. 1 shows a display device 100 in two modes including a full-screen display mode (left) and a front camera mode (right) in an embodiment of the present application. Referring to FIG. 1, a middle frame 10 includes an upper end 11 and a lower end 12, a front camera 91 is installed on the upper end 11 of the middle frame 10, and a flexible display 30 is separately prepared from the middle frame 10. The flexible display 30 is reciprocally movable in a first direction (from the upper end 11 to the lower end 12) relative to the middle frame 10 to expose or cover the front camera 91, thereby achieving a switch of the display device 100 between a full-screen display mode and a front camera mode as desired.

Figure 2:
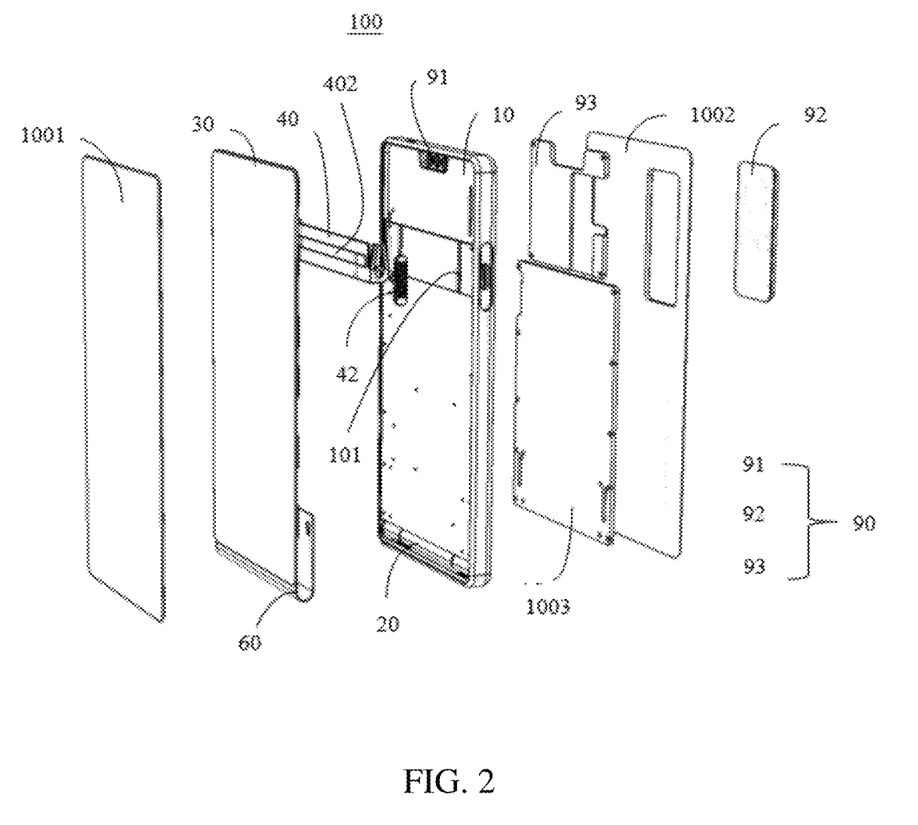
FIG. 2 is a schematic perspective exploded view of the display device of the present application at a first angle.
Figure 3:
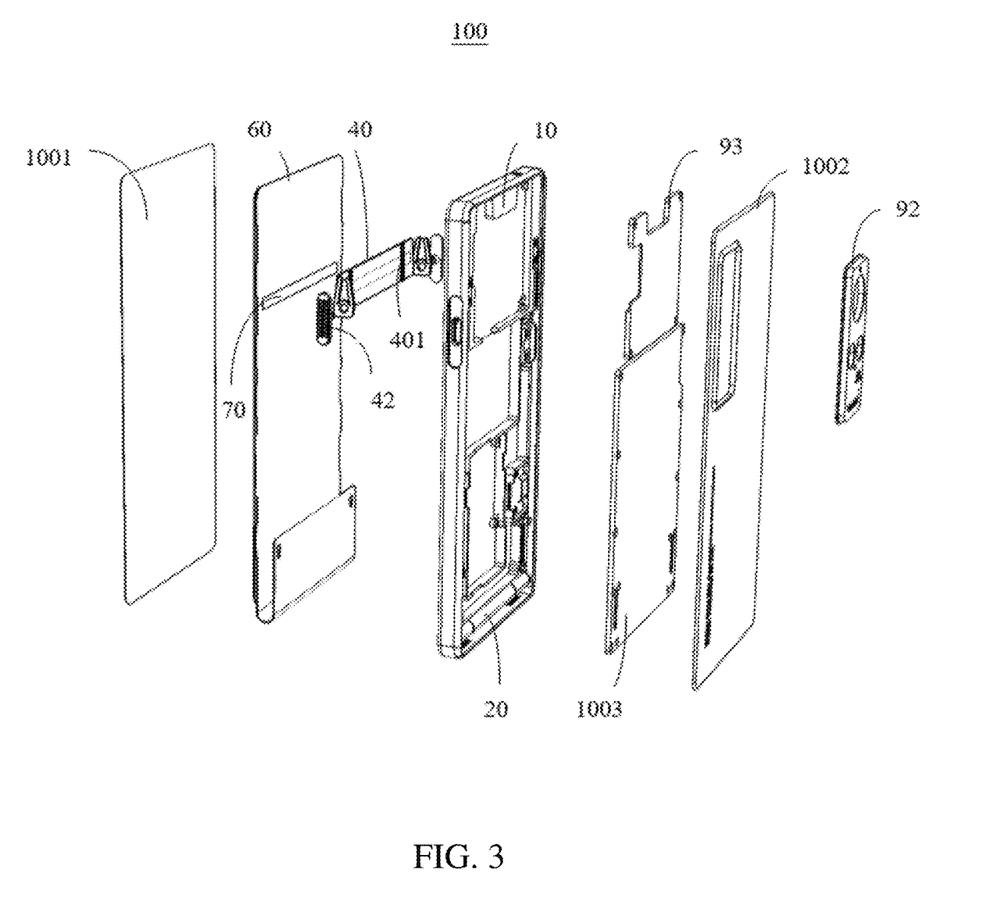
FIG. 3 is a schematic perspective exploded view of the display device of the present application at a second angle.

FIGS. 2 and 3 are schematic perspective exploded views of the display device 100 at two different angles of an embodiment of the present application. Referring to FIGS. 2 and 3, the display device 100 at least includes the middle frame 10, a roller 20, a flexible display 30, a sliding mechanism 40, and the front camera 91. The roller 20 is rotatably mounted on the middle frame 10 and is arranged close to the lower end 12, and the front camera 91 is installed on the middle frame 10 and is located close to the upper end 11. The sliding mechanism 40 is slidably mounted to the middle frame 10, and the flexible display 30 is fixedly disposed on the sliding mechanism 40. Specifically, the sliding mechanism 40 is reciprocally movable in a first direction relative to the middle frame 10 to drive the flexible display 30 to expose or cover the front camera 91.

Compared to the prior art, in the display device 100 of the present application, the flexible display 30 is separately prepared from the middle frame 10 and is fixedly installed on the sliding mechanism 40. Based on a sliding connection between the sliding mechanism 40 and the middle frame 10, when the sliding mechanism 40 slides up and down relative to the middle frame 10, the flexible display 30 is driven to expose or cover the front camera 91, thereby achieving a switch between a full-screen display mode and a front camera mode of the display device 100 as desired. Also, the sliding connection between the sliding mechanism 40 and the middle frame 10 effectively improves smoothness and stability of the display device 100 when switching between the full-screen display mode and the front camera mode. In addition, the present application uses the design of the flexible display 30 to cooperate with the roller 20, so that an area of the flexible display 30 can be exactly the same as a display area, and can also be substantially the same as a plane area of the display device 100, thereby truly achieving a full-screen design.

In addition to the above-mentioned structural elements, the display device 100 of the present application may further include other structural elements in various embodiments to improve a variety of performances of the display device 100. The following briefly introduces some other structural elements of this embodiment. certainly, it can be understood that these structural elements are not a limitation of the application, and other similar structural elements that can achieve the same function should also belong to the protection scope of this application In this embodiment, the display device 100 further includes a support member 60. The support member 60 is curled on the roller 20. The flexible display 30 is carried on the support member 60 and is fixedly disposed on the sliding mechanism 40 by the support member 60. The supporting member 60 utilizes its own supporting performance to ensure that the flexible display 30 has good flatness and curling properties during a sliding process. In this embodiment, the supporting member 60 is made of steel plate material. As a result, the display device 100 further provides an auxiliary plate 70 to assist in completing the fixed connection between the support member 60 and the sliding mechanism 40.

In this embodiment, the display device 100 further includes a circlip assembly 80. The circlip assembly 80 is assembled on the middle frame 10 and is arranged close to the lower end 12. The circlip assembly 80 connects one end of the support member 60 to the lower end of the middle frame 10 and takes advantage of its own elasticity to ensure that the smoothness and stability of sliding of the sliding mechanism 40 when the sliding mechanism drives the support member 60 and the flexible display 30 to move.

In this embodiment, the display device 100 further includes a limiting element 50 disposed on the middle frame 10 and arranged close to the upper end 11. The limiting element 50 is configured to cooperate with the sliding mechanism 40 to limit a movement range of the flexible display 30 driven by the sliding mechanism 40. Specifically, when the flexible display covers the front camera 91 to achieve the full-screen display mode, the limiting element 50 is engaged with the sliding mechanism 40 to restrict the sliding mechanism 40 from driving the flexible display 30 to continuously slide upward. When the flexible display 30 needs to expose the front camera 91 to achieve the front camera mode, the limiting element 50 is disengaged from the sliding mechanism 40 and releases the restriction on the sliding mechanism 40, so that the sliding mechanism 40 can drive the flexible display to slide downward under an action of external force to expose the front camera 91.

In one embodiment, the display device 100 further includes a protective cover 1001 and a rear cover 1002. The protective cover 1001 and the rear cover 1002 are assembled on front and rear sides of the middle frame 10, respectively, to protect various elements of the display device 100. Specifically, the protective cover 1001 is disposed on the front side of the middle frame 10 and covers the flexible display 30 to protect the flexible display 30.

In addition to the above-mentioned structural elements, the display device 100 also includes an electronic element mounting board 1003 and some general functional elements, such as a camera module 90, a battery, a circuit board, etc., which are not described here. Specifically, the camera module 90 may include, in addition to the aforementioned front camera 91, a rear camera 92 and a camera mounting plate 93 for installing the rear camera 92. In this embodiment, the camera mounting plate 93 is disposed on the rear side of the middle frame 10. In this embodiment, the electronic component mounting board 1003 is disposed on the rear side of the middle frame 10, and the rear cover 1002 covers the camera mounting plate 93 and exposes the rear camera 92. The middle frame 10 is further provided with a number of accommodating cavities for accommodating the general functional elements.

The foregoing is only a brief description of the structural elements of the display device 100 in this embodiment. The specific structure, mutual connection, and operation principle of the above-mentioned structural elements will be described in detail below. It should be noted that the following description does not limit the application, and other similar structures, connection relationships, and action relationships that can achieve the same functions should also fall within the protection scope of the application.

Please refer to FIG. 4 to FIG. 8, which are schematic assembly views of the above-mentioned various structural elements.

One of the sliding member 40 or the middle frame 10 is provided with at least a sliding key, and the other one is provided with a sliding groove matching the sliding key, wherein both the sliding key and the sliding groove extend in a first direction. The cooperation of the sliding key and the sliding groove realizes a sliding assembly of the sliding mechanism 40 on the middle frame 10, and also enhances smoothness and guiding of the sliding mechanism 40 relative to the middle frame 10 in operation. In this embodiment, a sliding key 401 is disposed on the sliding mechanism 40, a sliding groove 101 is formed on the middle frame 10, and a number of each of the sliding key 401 and the sliding groove 101 is two. It is understood that, in order to further enhance guiding of sliding, the sliding key 401 and the sliding groove 101 can also be increased or decreased according to actual requirements, and the number here does not limit the protection scope of the present application.

The support member 60 is fixedly connected to the sliding mechanism 40 through the auxiliary plate 70. In addition, an end of the support member 60 close to the lower end 12 bypasses the roller 20 and is fixed to the middle frame 10 by the circlip assembly 80. Specifically, the auxiliary plate 70 is fixed to one side of the support member 60 by a hot-melt adhesive. A mounting groove 402 is defined on the sliding mechanism 40, and has a shape and size adapted to a shape and size of the auxiliary plate 70. The auxiliary plate 70 is engaged in the mounting groove 402 to enable a fixed connection between the support member 60 and the sliding mechanism 40. Preferably, a hot-melt adhesive can further be applied between the sliding mechanism 40 and the auxiliary plate 70 to further strengthen the connection between the two.

Specifically, in this embodiment, the sliding mechanism 40 includes a sliding member 41 and at least a pushing member 42. The sliding key 401 and the mounting groove 402 are provided on the sliding member 41. The sliding member 41 is slidably mounted on the middle frame 10 through the sliding key 401, and the flexible display 30 is fixedly disposed on the sliding member 41 by the support member 60. The pushing member 42 is connected to the sliding member 41 and is configured to drive the sliding member 41 to move to enable the sliding mechanism 40 to be reciprocally movable in the first direction relative to the middle frame 10.

The sliding member 41 can be electrically driven by the pushing member 42 (for example, the pushing member 42 is indirectly connected to the sliding member 41 in an electric component or by an additional electric motor, so that the sliding member 41 is electrically driven by the pushing member 42), can be driven by mechanical transmission (the pushing member 42 is directly or indirectly connected to the sliding member 41 by means of mechanical transmission, so that the sliding member 41 is driven to move by means of the mechanical transmission), or can be directly driven under an external force, as long as the sliding member 41 can be driven to complete the movement according to a predetermined design.

In this embodiment, the sliding member 41 is directly driven by the pushing member 42 under the external force. Specifically, at least one pushing groove 102 is formed in the middle frame 10, and the pushing groove 102 passes through a side of the middle frame 10. The pushing member 42 is installed in the pushing groove 102 and is fixedly connected to the sliding member 41 such that the pushing member 42 is reciprocally movable along the pushing groove 102 under an action of an external force (such as a pushing force from a user's finger) to drive the sliding mechanism 40 to reciprocally move in the first direction relative to the middle frame 10.

Further, the sliding member 41 includes a main plate 411 and at least an ear plate 412, and the ear plate 412 is provided at one end of the main plate 411. The sliding key 401 and the mounting groove 402 are provided on opposite sides of the main plate 411, respectively. The main plate 411 is slidably mounted on the middle frame 10 through the sliding key 401, the flexible display 30 is fixedly disposed on the main plate 411 by the support member 60, and the pushing member 42 is fixedly connected to the ear plate 412. The limiting element 50 cooperates with the ear plate 412 to limit a movement range of the flexible display 30 driven by the sliding mechanism 40.

Further, the ear plate 412 includes a connecting portion 4121 and a clamping portion 4122. The connecting portion 4121 is disposed at one end of the main plate 411, the pushing member 42 is fixed connected to the connecting portion 4121, and the limiting element 50 cooperates with the clamping portion 4122. Specifically, the connecting portion 4121 is provided with a connecting hole 41211, and the pushing member 42 is fixedly connected to the connecting portion 4121 through the connecting hole 41211. The clamping portion 4122 includes two clamping arms 41221 extending outward from a same side of the connecting portion 4121. Free ends of the two clamping arms 41221 are inclined toward each other and cooperate with the connecting portion 4121 to form an elastic slot 41222 with an opening toward the upper end 11. When the flexible display 30 covers the front camera 91 to achieve full-screen display, the limiting element 50 is engaged in the elastic slot 41222. When the flexible display 30 exposes the front camera 91, the limiting element 50 is disengaged from the elastic slot 41222.

In this embodiment, a number of the ear plate 412, the pushing member 42 and the limiting element 50 are all two. The two ear plates 412 are disposed at opposite ends of the main plate 411, respectively. Each of the ear plates 412 cooperates with the corresponding pushing member 42 and the corresponding limiting element 50. Specifically, the middle frame 10 is provided with two pushing grooves 102. Each of the two pushing grooves 102 passes through opposite sides of the middle frame 10. The two pushing members 42 are disposed in the two pushing grooves 102, respectively, and are fixedly connected to opposite ends of the sliding member 41 through the ear plates 412.

Further, the pushing member 42 includes a pushing portion 421 and a connecting pin 422 connected with the pushing portion 421. The pushing groove 102 includes a first pushing groove 1021 and a second pushing groove 1022. The first pushing groove 1021 is recessed inwardly from an outer surface of the middle frame 10, and the second pushing groove 1022 is defined to pass through the side of the middle frame 10 from a middle of a bottom of the first pushing groove 1021. The connecting pin 422 passes through the second pushing groove 1022 and is fixedly connected to the sliding member 41, and the pushing portion 421 is accommodated in the first pushing groove 1021. Specifically, the connecting pin 422 is fixed in the connecting hole 41211. It is understood that each of the first pushing groove 1021 and the second pushing groove 1022 extends in the first direction to provide a reciprocating space for the pushing portion 421 and the connecting pin 422 during the sliding process.

Preferably, an outer surface of the pushing portion 421 is configured with a plurality of microstructures, such as protrusions, recesses, etc. The microstructures can increase friction between the user's finger and the pushing portion 421, thereby facilitating a user's pushing on the pushing portion 421, so that the sliding mechanism 40 is driven to slide relative to the middle frame 10.

Specifically, in this embodiment, the support member 60 includes a first rigid part 61, a flexible part 62, and a second rigid part 63. The flexible part 62 connects the first rigid part 61 to the second rigid part 61. The auxiliary plate 70 is disposed on a side of the first rigid part 61 facing the middle frame and the sliding mechanism 40 is fixedly connected to the first rigid part 61 through the auxiliary plate 70. The flexible part 62 is curled on the roller 20. The flexible display 30 is carried on the first rigid part 61 and a portion of the flexible part 62. The second rigid part 63 is fixed to the middle frame 10 by a circlip assembly 80.

The circlip assembly 80 includes two bayonets 81 and two springs 82. Two accommodating grooves 13 are formed in the middle frame 10, and the two springs 82 are accommodated in the two accommodating grooves 13, respectively. One end of each of the springs 82 abuts against an inner wall of the corresponding accommodating groove 13, and the other end is secured to the second rigid part 63 through the corresponding bayonet 81. Specifically, the second rigid part 63 is provided with two fixing holes 631 for fixing the two bayonets 81, respectively. In this embodiment, the bayonet 81 is L-shaped. One end of the bayonet 81 is inserted through and engaged in the corresponding fixing hole 631, and the other end of the bayonet 81 passes through the corresponding spring 82 to be retained in the spring 82. When the display device 100 is in the full-screen display mode, the springs 82 are in a compressed state E1; when the display device 100 is in the front camera mode, the springs 82 are in a compressed state E2 or an original state E0. In a process of the display device 100 being gradually switched from the full-screen display mode to the front camera mode, the springs 82 gradually transitions from the compressed state E1 to the compressed state E2 or the original state E0. This embodiment utilizes elastic recovery characteristics of the springs 82 When the sliding mechanism 40 drives the support member 60 and the flexible display 30 to move, under dual actions of the external force and a spring force, smoothness and stability of sliding are enhanced, as well as flatness and curling properties of the support member 60 and the flexible display 30.

Further, the support member 60 and the middle frame 10 are provided with corresponding and mutually matched microstructures. Using the cooperation of the microstructures to further ensure the smoothness and flatness of the movement of the support member 60 in the middle frame 10, thereby further preventing risks of warping and arching of the flexible display during the sliding process. In this embodiment, first microstructures 611 are disposed on opposite sides of the first rigid part 61 of the support member and second microstructures 103 are disposed on inner sidewalls of opposite sides of the middle frame 10. Specifically, each of the first microstructure 611 is composed of a plurality of spaced micro-protrusions. The micro-protrusions extend outward from an edge of the first rigid part 61, and a width of the first rigid part 61 at a location where the micro-protrusions are provided is greater than a width of a corresponding part of the flexible display 30, so that the flexible display 30 is wrapped during the sliding process, thereby preventing the flexible display 30 from being damaged.

Figure 9:
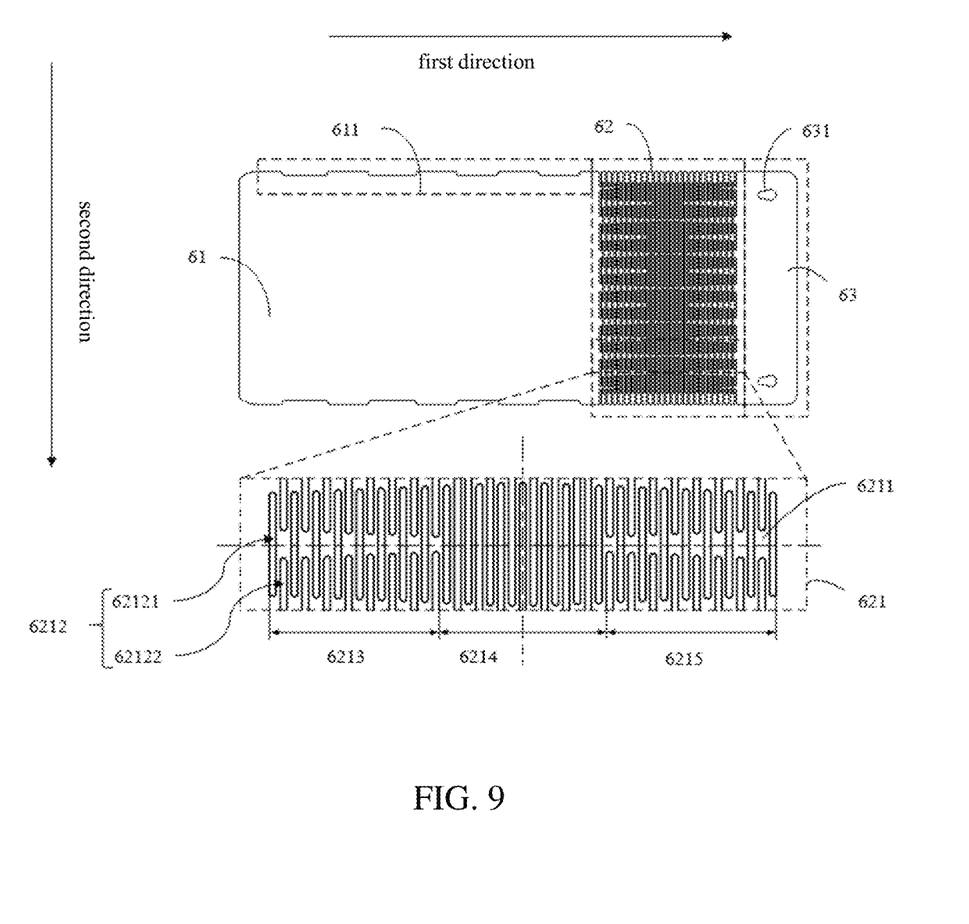
FIG. 9 is a schematic expanded view along with an enlarged portion of the support member of the display device of the present application.
Figure 10:
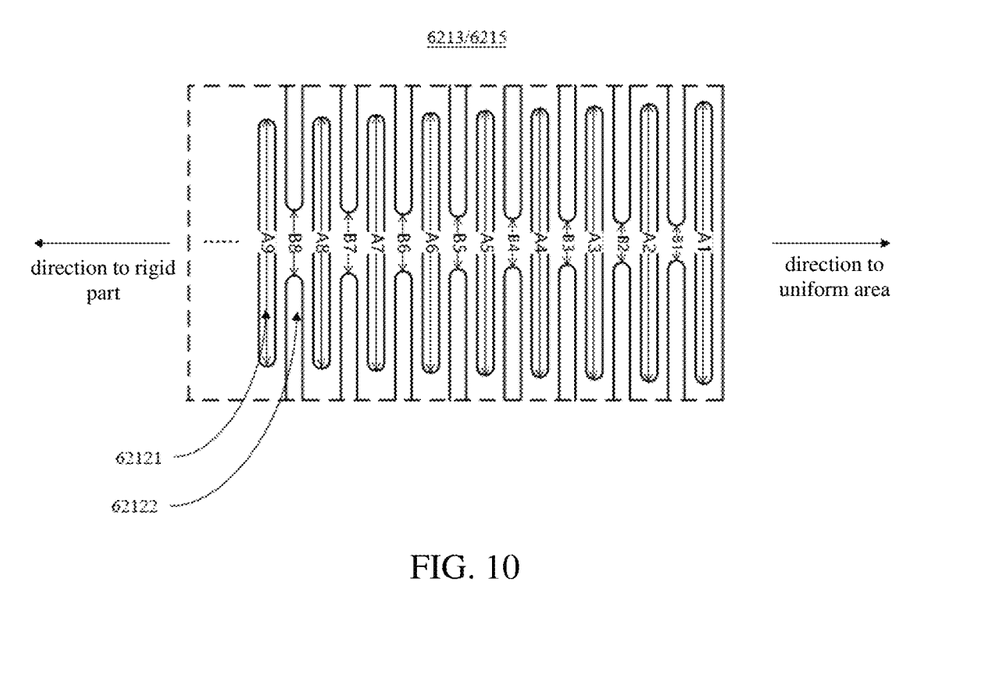
FIG. 10 is a schematic view showing a working principle of the support member of the display device in a gradient area of the present application.

Please refer to FIGS. 9 and 10. In this embodiment, in order to improve curling performance of the flexible part 62, the flexible part 62 is composed of a plurality of patterned structures 621 arranged in the second direction. Specifically, the second direction is perpendicular to the first direction.

In this embodiment, each of the patterned structures 621 includes a main board 6211 and a plurality of hollow strips 6212 defined in the main board 6211. The hollow strips 6212 extend in the second direction and include first hollow strips 62121 and second hollow strips 62122. The first hollow strips 62121 and the second hollow strips 62122 are sequentially spaced apart from each other and arranged in a staggered manner in the first direction. It is understood that the distribution, shape, and size of hollow strips of the patterned structure 621 can be designed according to actual requirements and are not limited to the structure of this embodiment, and other similar layouts that can achieve the same function should also fall within the protection scope of this application.

Further, during sliding, in order to prevent the support member 60 from being affected by uneven force causing a fracture problem occurred in part of a patterned structure at a juncture of the flexible part 62 and rigid parts (the first rigid part 61 and the second rigid part 63) due to stretching, the patterned structures 621 are configured with gradient areas. Specifically, each of the patterned structures 621 includes a first gradient area 6213, a uniform area 6214, and a second gradient area 6215 that are sequentially arranged in the first direction. A hole opening ratio of the patterned structure 621 in the uniform area 6214 in the first direction remains unchanged. A hole opening ratio of the patterned structure 621 in the first gradient area 6213 and a hole opening ratio of the patterned structure 621 in the second gradient area 6215 gradually increase in a direction toward the uniform area 6214.

Specifically, in this embodiment, in the first gradient area 6213 and the second gradient 6215, a length of each of the first hollow strips 62121 in the second direction (A1, A2 . . . ) gradually increases in the direction toward the uniform area 6214. A distance (B1, B2 . . . ) between adjacent ones of the second hollow strips 62122 in the second direction gradually decreases in the direction toward the uniform area 6214.

An assembling process of the display device 100 may first assemble some structural elements to form an assembly set according to actual conditions, and further assembly is performed until an assembly operation of the entire display device is completed. An assembly of the display device 100 of this embodiment will be described in detail below. It should be noted that the following description is only to illustrate the connection relationship between the components, not to limit the assembly sequence. The assembly sequence between the various structural elements can be adjusted and corrected according to the actual work, the assembly sequence between the structural elements is not a limitation of the application, and other assembling methods capable of realizing the display device 100 should also fall within the protection scope of the present application.

Figure 5:
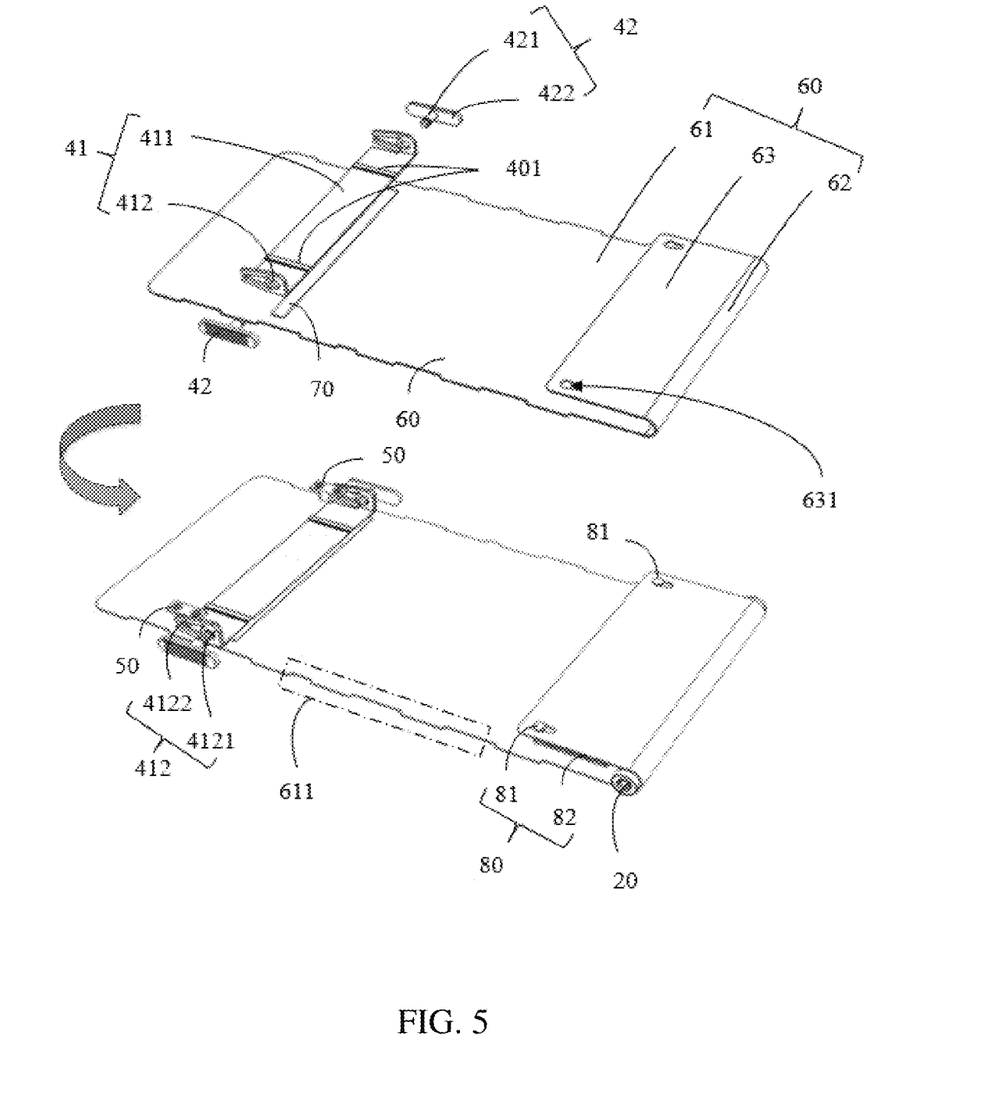
FIG. 5 is a schematic assembly view of a sliding mechanism and the support member of the display device of the present application.

In this embodiment, the display device 100 is assembled as follows:

Fixing the auxiliary plate 70 to the first rigid part 61 of the support member 60 by a hot-melt adhesive, so that the auxiliary plate 70 faces the middle frame 10, as shown in FIGS. 3 and 5.

The sliding member 41 of the sliding mechanism 40 is mounted on the first rigid part 61 of the support member 60 through engagement between the mounting groove 402 in the main plate 411 of the sliding member 41 and the auxiliary plate 70, as shown in FIG. 5. Specifically, the elastic slot 41222 of the ear plate 412 of the sliding member 41 faces away from the second rigid part 63 of the support member 60.

Install the circlip assembly 80 being assembled into an accommodating cavity of the middle frame 10. Make the flexible part 62 of the support member 60 curl on the roller 20. Install the roller 20 into the accommodating cavity of the middle frame 10. In addition, the bayonet 81 of the circlip assembly 80 is fixed to the fixing hole 631 of the second rigid part 63, as shown in FIGS. 5, 7, and 8.

Figure 7:
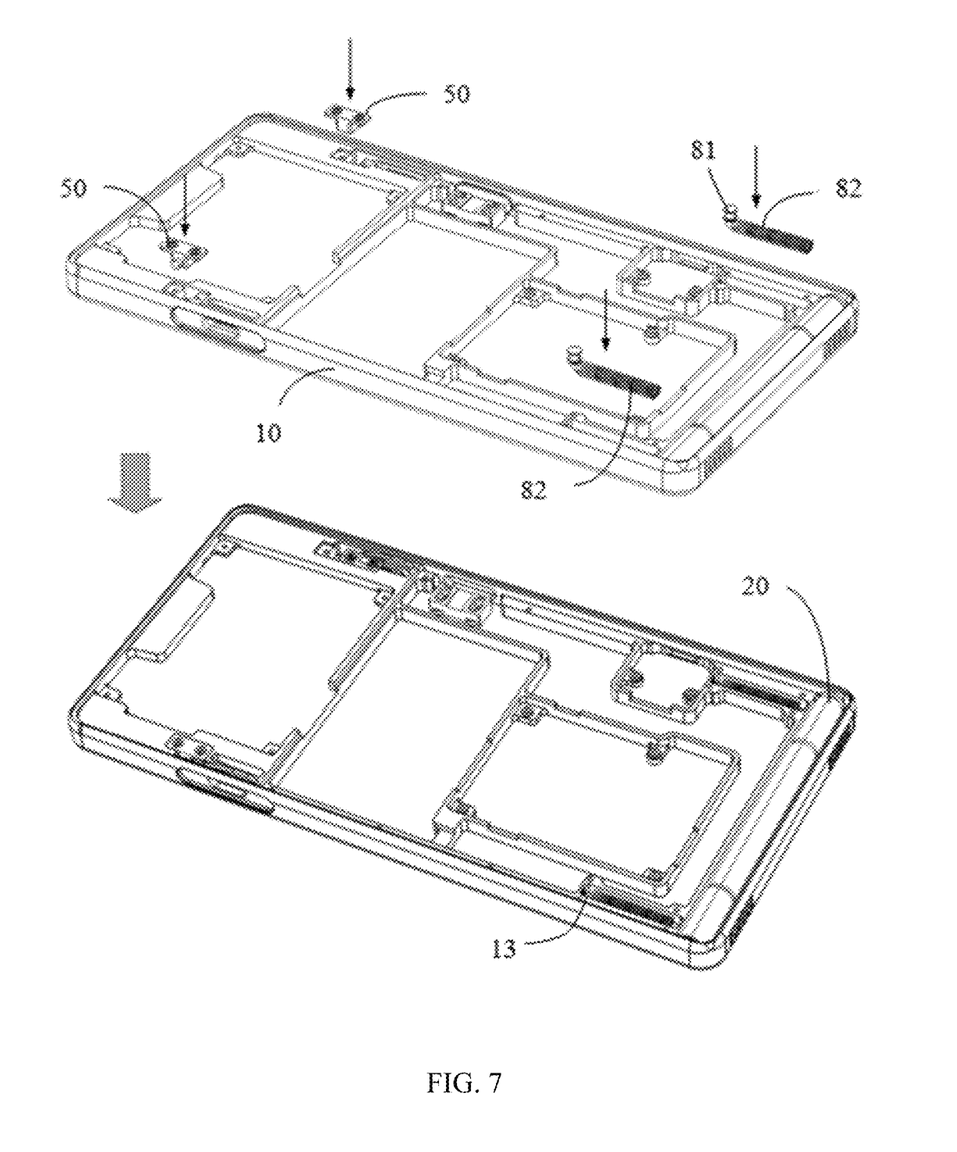
FIG. 7 is a schematic assembly view of a limiting element and a circlip assembly of the display device of the present application.
Figure 8:
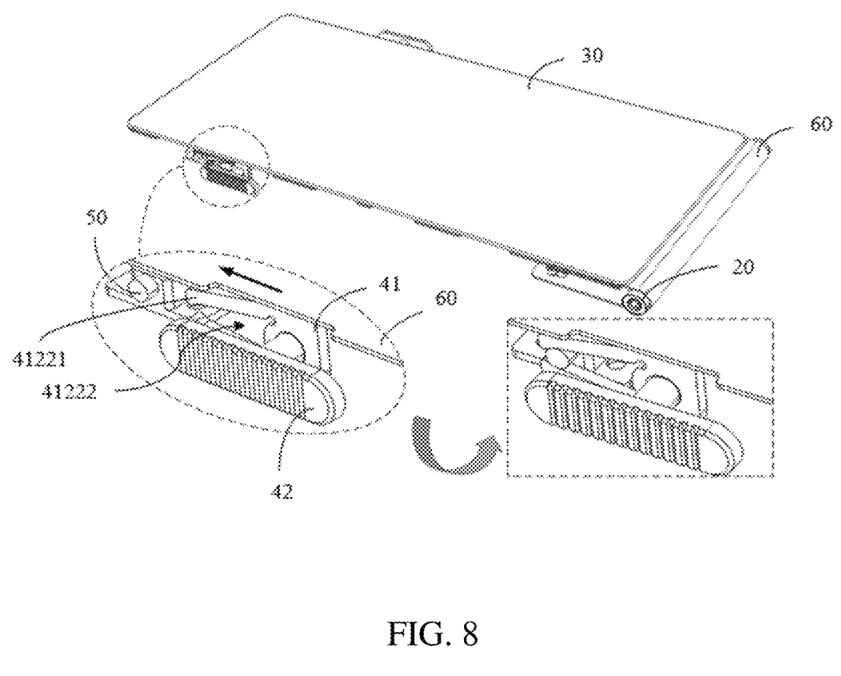
FIG. 8 is a schematic perspective view showing the sliding mechanism and the limiting element of the display device in two modes of the present application.

The limiting element 50 is assembled into the accommodating cavity of the middle frame 10, as shown in FIG. 7.

Figure 6:
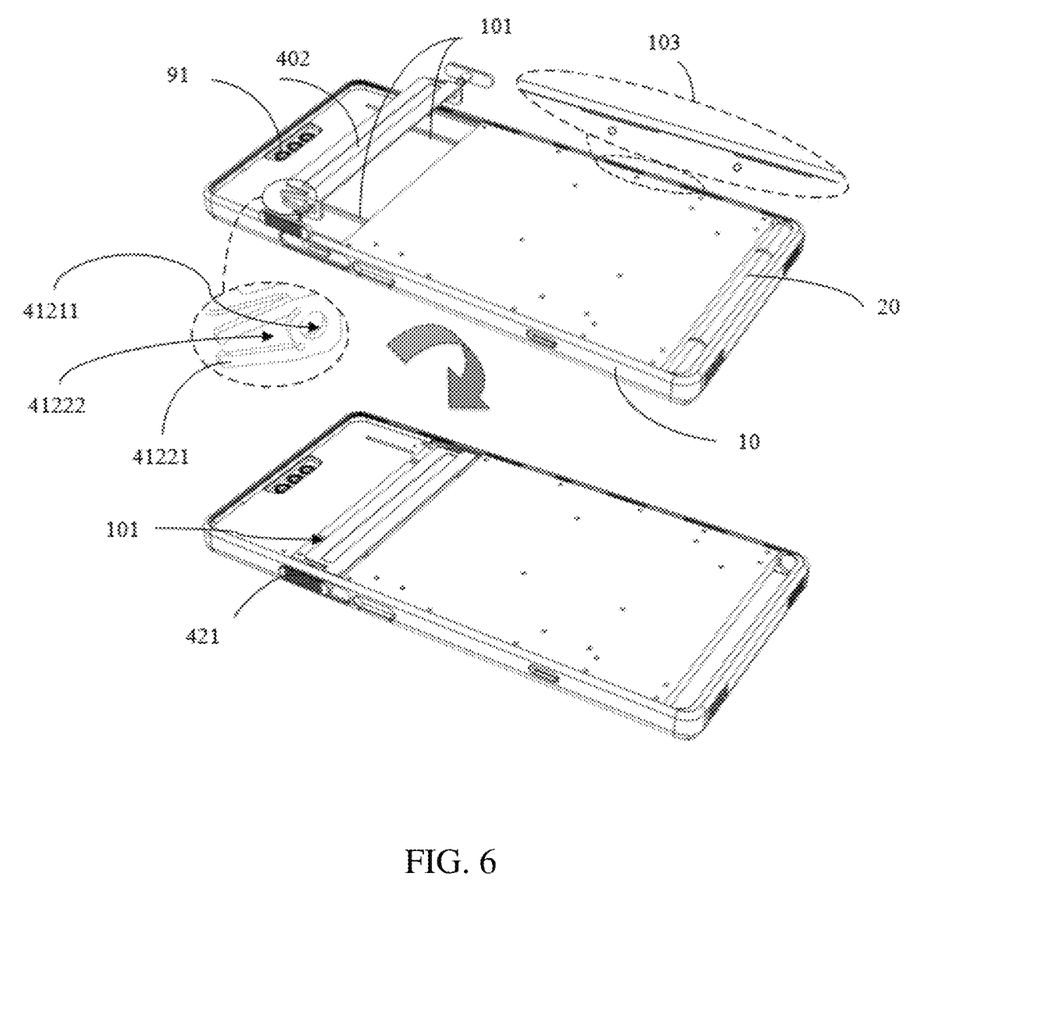
FIG. 6 is a schematic assembly view of the sliding mechanism and the middle frame of the display device of the present application.

The sliding member 41 of the sliding mechanism 40 is slidably mounted to the middle frame 10 through cooperation of the sliding key 401 on the main plate 411 of the sliding member 41 and the sliding groove 101 in the middle frame 10. Furthermore, the first microstructure 611 on the first rigid part 61 of the support member 60 is engaged with the second microstructure 103 on the middle frame 10, as shown in FIGS. 5 and 6.

The pushing member 42 of the sliding mechanism 40 is inserted into the pushing groove 102 from the side of the middle frame 10, so that the connecting pin 422 of the pushing member 42 is fixed in the connecting hole 41211 of the ear plate 412 of the sliding member 41. In this way, the connecting pin 422 of the pushing member 42 passes through the second pushing groove 1022, and the pushing portion 421 of the pushing member 42 is located in the first pushing groove 1021, as shown in FIGS. 4 and 8.

Figure 4:
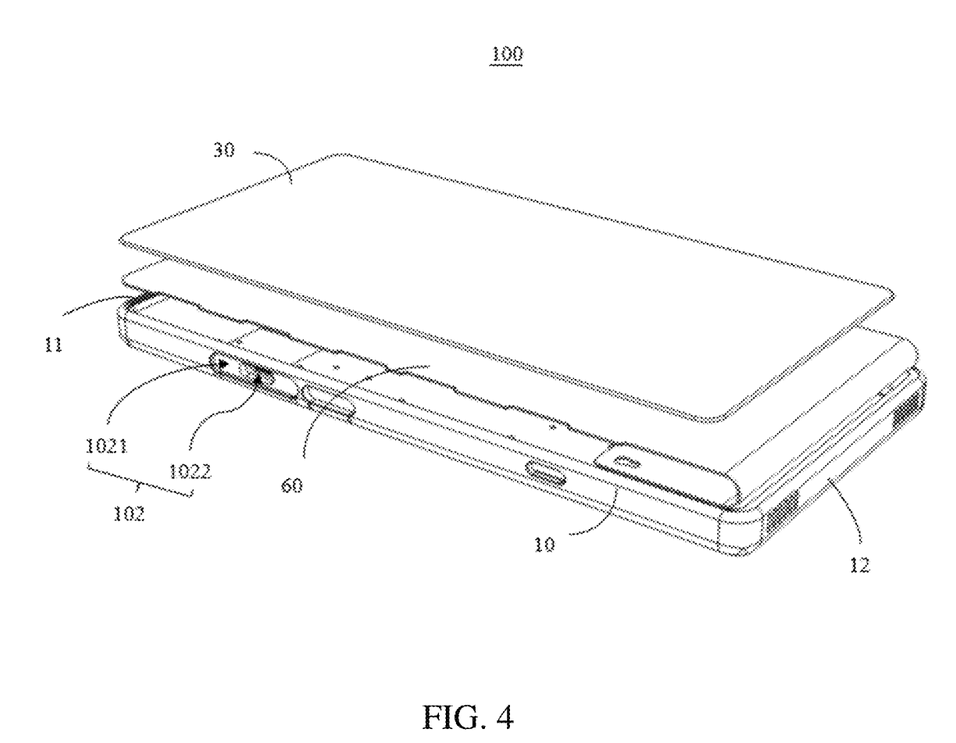
FIG. 4 is a schematic assembly view of a middle frame, a support member, and a flexible display of the display device of the present application.

The flexible display 30 is installed on the first rigid part 61 of the support member 60; the protective cover 1001 is installed on the middle frame 10, as shown in FIGS. 2 and 4.

Other structural components, such as the rear camera 92, electronic components, the rear cover 1002, etc., are also installed, thereby completing the assembly of the display device 100.

In this embodiment, when the display device 100 is switched between the full-screen display mode and the front camera mode, actions between the structural elements of the display device 100 are as follows (the full-screen display mode is used as an original mode for description).

When the display device 100 is in the full-screen display mode, the limiting element 50 is engaged in the elastic slot 41222 between the two clamping arms 41221 of the ear plate 412 of the sliding mechanism 40, and part of the support member 60 close to the upper end 11 of the middle frame 10 is securely placed. At this time, the spring 82 of the circlip assembly 80 is in the compressed state E1, so as to apply an elastic force to the second rigid part 63 of the support member 60 in a direction toward the upper end 11 of the middle frame 10 (that is, a direction opposite to the first direction). The support member 60, under the balance of the elastic force, a fixing force applied by the limiting element 50 (the direction opposite to the first direction), and a resisting force applied by the roller 20 (the first direction), has well flatness and curling properties. As a result, the flexible display 30 carried on the support member 60 also has good flatness and curling properties. At this time, the portion of the flexible part 62 of the support member 60 close to the first rigid part 61 is in a same layer as the first rigid part 61, so as to carry the flexible display 30 together with the first rigid part 61. In this way, the flexible display 30 corresponds to an entire display surface and is able to perform full-screen display.

When the display device 100 switches from the full-screen display mode to the front camera mode, the user applies an external force on an outside of the middle frame 10 to push the pushing member 42 of the sliding mechanism 40 in the first direction. At this time, the limiting element 50 is disengaged from the elastic slot 41222 under the action of the user's external force. The pushing member 42 drives the sliding member 41 to slide in the first direction relative to the middle frame 10. While sliding, the sliding member 41 drives the support member 60 and the flexible display 30 to slide in the first direction relative to the middle frame 10, so that the support member 60 and the flexible display 30 gradually uncover the front camera 91 until the front camera 91 is completely exposed. During this process, the flexible part 62 of the support member 60 is further curled on the roller 20 such that the part of the support member 60 being further curled gradually travels to a same layer as the second rigid part 63. While the flexible part 62 is further curled, the part of the flexible display 30 carried on the flexible part 62 is curled on the roller 20 together with the flexible part 62, so as to reduce an area of the flexible display 30 corresponding to the display surface, and to gradually uncover the front camera 91 until the front camera 91 is completely exposed. During this process, the spring 82 gradually transitions from the compressed state E1 to the compressed state E2 or the original state E0, wherein the spring 82 still applies the elastic force (gradually) toward the upper end 11 of the middle frame 10 (that is, the direction opposite to the first direction) to the second rigid part 63 of the support member 60 (gradually decrease). The elastic force can effectively compensate for unevenness of the external force exerted by the user, and effectively improve the smoothness and stability of the sliding of the flexible display 30 driven by the support member 60; in addition, a microstructure cooperation between the first microstructure 611 of the first rigid part 61 of the support member 60 and the second microstructure 103 provided on the middle frame 10 provides a frictional force (stuck force) for the support member 60 in a direction opposite to the first direction during the sliding process. The combination of the frictional force and the elastic force provided by the spring 82 further enhances the stability of the support member 60 in driving the flexible display 30 to move.

When the display device 100 switches from the front camera mode to the full-screen display mode, the user applies an external force on the outside of the middle frame 10 in the direction opposite to the first direction to push the pushing member 42 of the sliding mechanism 40, so that the pushing member 42 drives the sliding member 41 fixedly connected to the pushing member 42 to slide toward the upper end 11 of the middle frame 10 relative to the middle frame 10. While sliding, the sliding member 41 drives the support member 60 and the flexible display 30 to slide toward the upper end 11 of the middle frame 10, so that the support member 60 and the flexible display 30 gradually cover the front camera 91 until the limiting element 50 is engaged in the elastic slot 41222. During this process, the spring 82 is gradually compressed, gradually transitioning from the compressed state E2 or the original state E0 to the compressed state E1; at the same time, the flexible part 62 of the support member 60 is reversely curled on the roller 20, so that the part of the flexible display 30 carried on the flexible portion 62 gradually returns to a flat surface corresponding to the display surface, thereby gradually covering the front camera 91.

Accordingly, although the present invention has been disclosed as a preferred embodiment, it is not intended to limit the present invention. Those skilled in the art without departing from the scope of the present invention may make various changes or modifications, and thus the scope of the present invention should be after the appended claims and their equivalents.

What is claimed is:

1. A display device, comprising:
   a middle frame having an upper end and a lower end;
   a roller rotatably mounted on the middle frame and arranged close to the lower end;
   a front camera installed on the middle frame and arranged close to the upper end;
   a sliding mechanism slidably mounted to the middle frame; and
   a flexible display fixedly disposed on the sliding mechanism;
   wherein the sliding mechanism is reciprocally movable in a first direction relative to the middle frame to drive the flexible display to expose or cover the front camera, and wherein when the flexible display exposes the front camera, part of the flexible display close to the lower end is curled on the roller, and when the display device is in a full-screen display mode, the part of the flexible display close to the lower end is away from the roller;
   wherein the sliding mechanism comprises a sliding member and at least one pushing member, wherein the sliding member is slidably mounted to the middle frame, the flexible display is fixedly disposed on the sliding member, and the pushing member is connected to the sliding member, wherein the pushing member is configured to drive the sliding member to be reciprocally movable in the first direction relative to the middle frame;
   wherein the sliding member comprises a main plate and at least an ear plate, wherein the ear plate is disposed at one end of the main plate, the main plate is slidably mounted on the middle frame, the flexible display is fixedly mounted on the main plate, and the pushing member is fixedly connected to the ear plate;
   wherein the display device further comprises at least a limiting element, wherein the ear plate comprises a connecting portion and a clamping portion, wherein the connecting portion is disposed at one end of the main plate, the pushing member is fixedly connected to the connecting portion, the clamping portion includes two clamping arms extending outward from a same side of the connecting portion, and an elastic slot having an opening toward the upper end is defined by an area between the two clamping arms and the connecting portion, wherein when the display device is in the full-screen display mode, the limiting element is engaged in the elastic slot, and when the flexible display exposes the front camera, the limiting element is disengaged from the elastic slot.

2. The display device of claim 1, wherein the middle frame is provided with at least a pushing groove passing through a side of the middle frame, and the pushing member is installed in the pushing groove and is fixedly connected to the sliding member, so that the pushing member is reciprocally movable along the pushing groove under an action of an external force to drive the sliding mechanism to reciprocally move in the first direction relative to the middle frame.

3. The display device of claim 1, wherein one of the sliding member or the middle frame is provided with at least a sliding key, and the other one is provided with a sliding groove matching the sliding key.

4. The display device of claim 2, wherein the pushing member comprises a pushing portion and a connecting pin connected with the pushing portion, and the pushing groove comprises a first pushing groove and a second pushing groove, wherein the first pushing groove is recessed inwardly from an outer surface of the middle frame, the second pushing groove is defined to pass through the side of the middle frame from a middle of a bottom of the first pushing groove, the connecting pin passes through the second pushing groove and is fixedly connected to the sliding member, and the pushing portion is accommodated in the first pushing groove.

5. The display device of claim 4, wherein a plurality of microstructures are disposed on an outer surface of the pushing portion.

6. The display device of claim 2, wherein the display device comprises two pushing members, and the middle frame comprises two pushing grooves, wherein each of the two pushing grooves passes through opposite sides of the middle frame, and the two pushing members are disposed in the two pushing grooves, respectively, and are fixedly connected to opposite ends of the sliding member.

7. The display device of claim 1, further comprising a support member fixedly disposed on the sliding mechanism and curled on the roller, wherein the flexible display is fixedly carried on the support member.

8. The display device of claim 7, further comprising an auxiliary plate fixed to one side of the support member by a hot-melt adhesive, wherein the sliding mechanism is fixedly connected with the auxiliary plate.

9. The display device according to claim 8, wherein a mounting groove is defined on the sliding mechanism and has a shape and size adapted to a shape and size of the auxiliary plate, and the auxiliary plate is engaged in the mounting groove.

10. The display device of claim 7, further comprising a circlip assembly, wherein the support member comprises a first rigid part, a flexible part, and a second rigid part, wherein the flexible part connects the first rigid part to the second rigid part, the sliding mechanism is fixedly connected to the first rigid part, the flexible part is curled on the roller, the second rigid part is fixed to the middle frame by the circlip assembly, and the flexible display is carried on the first rigid part and a portion of the flexible part.

11. The display device of claim 10, wherein the circlip assembly comprises two bayonets and two springs, and two accommodating grooves are located at the middle frame, wherein the two springs are accommodated in the two accommodating grooves, respectively, one end of each of the springs abuts against an inner wall of the corresponding accommodating groove, and the other end is secured to the second rigid part through the corresponding bayonet.

12. The display device of claim 10, wherein one of the first rigid part or the middle frame is provided with a first microstructure, and the other one is provided with a second microstructure matching the first microstructure.

13. The display device of claim 12, wherein the first microstructure is composed of a plurality of spaced micro-protrusions extending outward from an edge of the first rigid part, wherein a width of the first rigid part at a location where the micro-protrusions are provided is greater than a width of a corresponding part of the flexible display.

14. The display device of claim 10, wherein the flexible part is composed of a plurality of patterned structures arranged in a second direction, and the second direction is perpendicular to the first direction.

15. The display device of claim 14, wherein each of the patterned structures comprises a first gradient area, a uniform area, and a second gradient area that are sequentially arranged in the first direction, wherein the patterned structure has a hole opening ratio in the uniform area in the first direction remaining unchanged, and hole opening ratios of the patterned structures in the first gradient area and the patterned structures in the second gradient area gradually increase in a direction toward the uniform area.

16. The display device of claim 15, wherein each of the patterned structures comprises a main board and a plurality of hollow strips defined in the main board, wherein the hollow strips extend in the second direction and comprise first hollow strips and second hollow strips, and the first hollow strips and the second hollow strips are sequentially spaced apart from each other and arranged in a staggered manner in the first direction.

17. The display device of claim 16, wherein in the first gradient area and the second gradient area, a length of each of the first hollow strips in the second direction gradually increases in the direction toward the uniform area, and a distance between adjacent ones of the second hollow strips in the second direction gradually decreases in the direction toward the uniform area.

18. A display device, comprising:
a middle frame having an upper end and a lower end;
a roller rotatably mounted on the middle frame and arranged close to the lower end;
a front camera installed on the middle frame and arranged close to the upper end;
a sliding mechanism slidably mounted to the middle frame; and
a flexible display fixedly disposed on the sliding mechanism;
wherein the sliding mechanism is reciprocally movable in a first direction relative to the middle frame to drive the flexible display to expose or cover the front camera, and wherein when the flexible display exposes the front camera, part of the flexible display close to the lower end is curled on the roller, and when the display device is in a full-screen display mode, the part of the flexible display close to the lower end is away from the roller;
wherein the display device further comprises:
a support member fixedly disposed on the sliding mechanism and curled on the roller, wherein the flexible display is fixedly carried on the support member; and
an auxiliary plate fixed to one side of the support member by a hot-melt adhesive, wherein the sliding mechanism is fixedly connected with the auxiliary plate;
wherein a mounting groove is defined on the sliding mechanism and has a shape and size adapted to a shape and size of the auxiliary plate, and the auxiliary plate is engaged in the mounting groove.

19. The display device of claim 18, further comprising a circlip assembly, wherein the support member comprises a first rigid part, a flexible part, and a second rigid part, wherein the flexible part connects the first rigid part to the second rigid part, the sliding mechanism is fixedly connected to the first rigid part, the flexible part is curled on the roller, the second rigid part is fixed to the middle frame by the circlip assembly, and the flexible display is carried on the first rigid part and a portion of the flexible part.

20. A display device, comprising:
a middle frame having an upper end and a lower end;
a roller rotatably mounted on the middle frame and arranged close to the lower end;
a front camera installed on the middle frame and arranged close to the upper end;
a sliding mechanism slidably mounted to the middle frame; and
a flexible display fixedly disposed on the sliding mechanism;
wherein the sliding mechanism is reciprocally movable in a first direction relative to the middle frame to drive the flexible display to expose or cover the front camera, and wherein when the flexible display exposes the front camera, part of the flexible display close to the lower end is curled on the roller, and when the display device is in a full-screen display mode, the part of the flexible display close to the lower end is away from the roller;
wherein the display device further comprises:
a support member fixedly disposed on the sliding mechanism and curled on the roller, wherein the flexible display is fixedly carried on the support member; and
a circlip assembly, wherein the support member comprises a first rigid part, a flexible part, and a second rigid part, wherein the flexible part connects the first rigid part to the second rigid part, the sliding mechanism is fixedly connected to the first rigid part, the flexible part is curled on the roller, the second rigid part is fixed to the middle frame by the circlip assembly, and the flexible display is carried on the first rigid part and a portion of the flexible part;
wherein the circlip assembly comprises two bayonets and two springs, and two accommodating grooves are located at the middle frame, wherein the two springs are accommodated in the two accommodating grooves, respectively, one end of each of the springs abuts against an inner wall of the corresponding accommodating groove, and the other end is secured to the second rigid part through the corresponding bayonet.

* * * * *